J. R. PEIRCE.
RECORDING MECHANISM FOR WEIGHING AND SIMILAR MACHINES.
APPLICATION FILED FEB. 2, 1912.
1,261,434.
Patented Apr. 2, 1918.
4 SHEETS—SHEET 1.
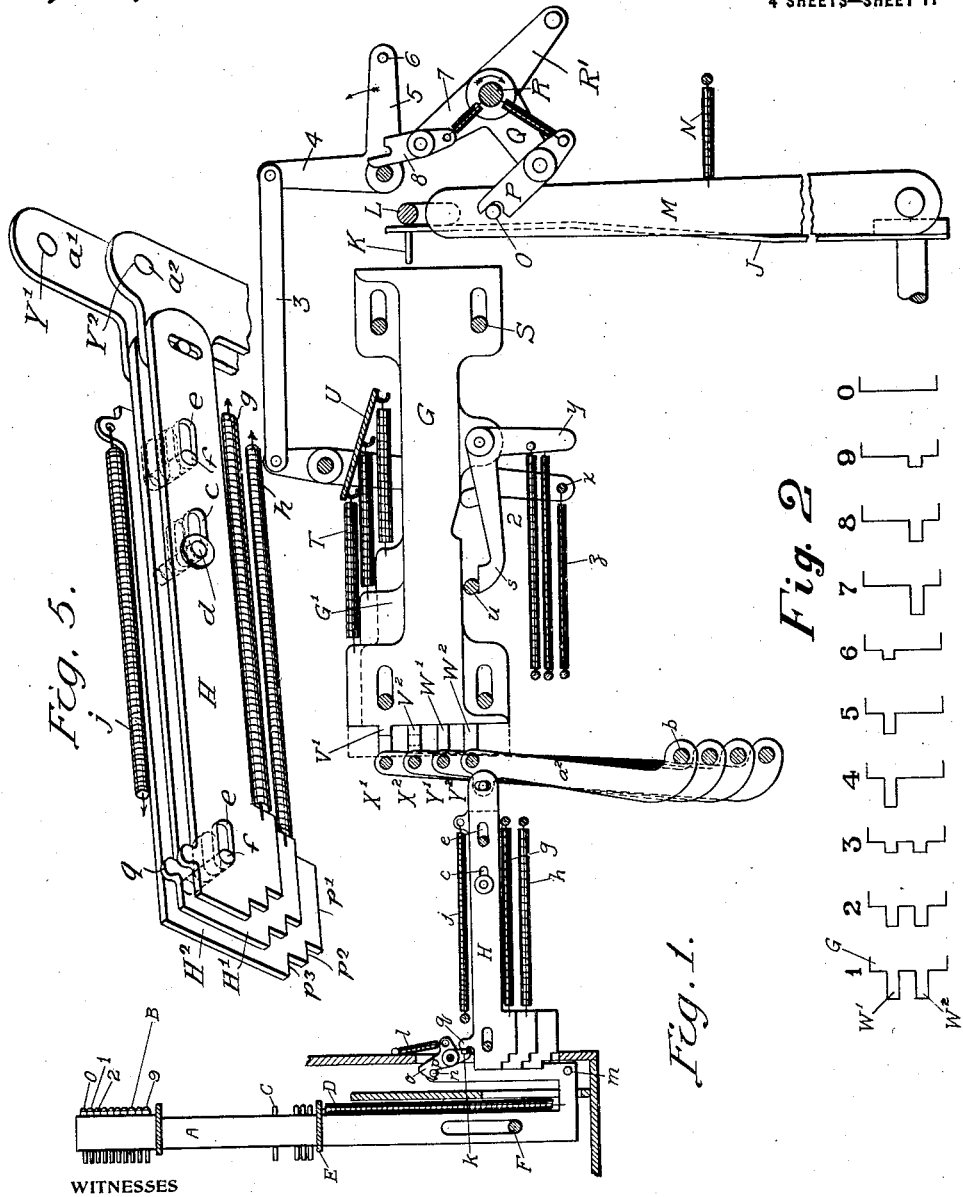

J. R. PEIRCE.
RECORDING MECHANISM FOR WEIGHING AND SIMILAR MACHINES.
APPLICATION FILED FEB. 2, 1912.

1,261,434.

Patented Apr. 2, 1918.
4 SHEETS—SHEET 2.

WITNESSES

INVENTOR
John Royden Peirce
BY
Anthony Usina
ATTORNEY

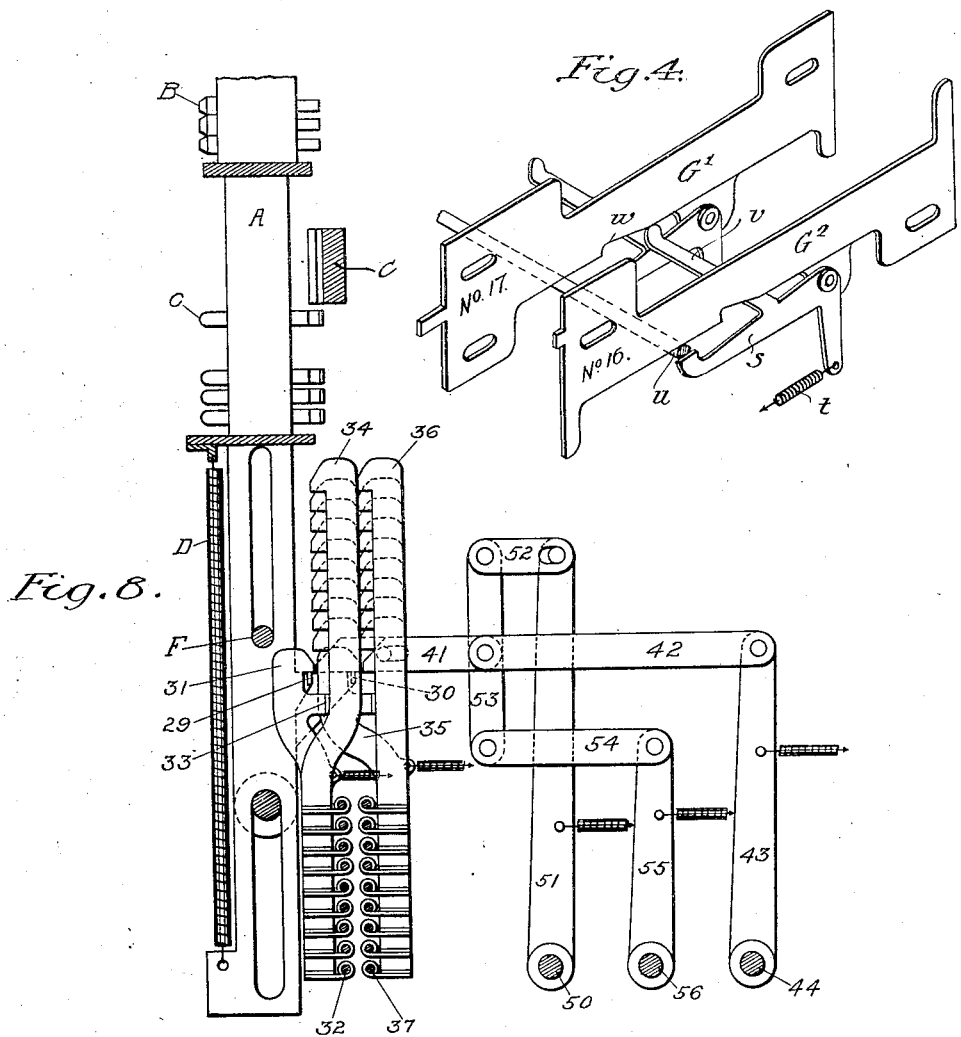

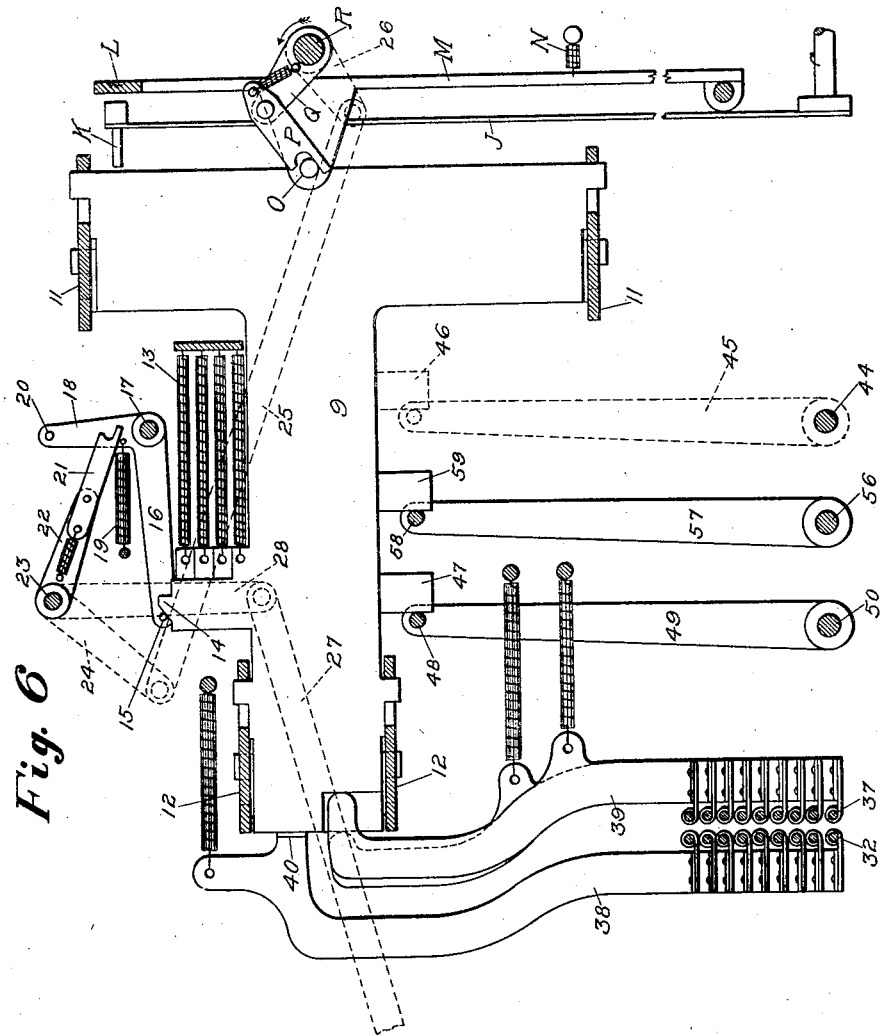

UNITED STATES PATENT OFFICE.

JOHN ROYDEN PEIRCE, OF NEW YORK, N. Y., ASSIGNOR TO PEIRCE PATENTS COMPANY, A CORPORATION OF NEW YORK.

RECORDING MECHANISM FOR WEIGHING AND SIMILAR MACHINES.

1,261,434.  Specification of Letters Patent.  Patented Apr. 2, 1918.

Application filed February 2, 1912. Serial No. 675,022.

*To all whom it may concern:*

Be it known that I, JOHN ROYDEN PEIRCE, a citizen of the United States, and residing in the borough of Manhattan, city, county, and State of New York, have invented certain new and useful Improvements in Recording Mechanism for Weighing and Similar Machines, of which the following is a specification.

In my previous application for patent No. 666,944 I have described certain machines for recording, by means of perforations and printing, upon a card, various items which are afterward to be distributed and classified in subsequent machines acting under the control of such cards; and have described such a machine including a weighing apparatus whereby a record might be made of successive weights as well as of other matters.

The present application relates to the mechanism for recording weights described in the previous application; and to other similar mechanisms, the invention being adapted to make the record in perforations or in print or in any other way which may be desired, and being applicable not only to weighing machines, but also to various other types of machines.

The accompanying drawings illustrate embodiments of the invention.

Figure 1 is a longitudinal section.

Fig. 2 is a diagrammatic view showing the shapes of certain parts corresponding to the successive digits.

Fig. 4 is a perspective view showing two of a first set of slides with the spaces between them exaggerated for the sake of clearness.

Fig. 5 is a perspective view of a second set of slides.

Fig. 6 is a side elevation of certain slides controlled by the weighing scales and controlling certain pivoted members, which in turn control the recording devices proper.

Fig. 7 is an end elevation of the pivoted members of Fig. 6.

Fig. 8 is a side elevation of the mechanism which immediately controls the movement of the recording devices. The mechanism of this figure stands alongside of the mechanism of Fig. 6 and in planes parallel thereto.

Figs. 1 to 5 represent one machine, and Figs. 6 to 8 another.

Figure 3:
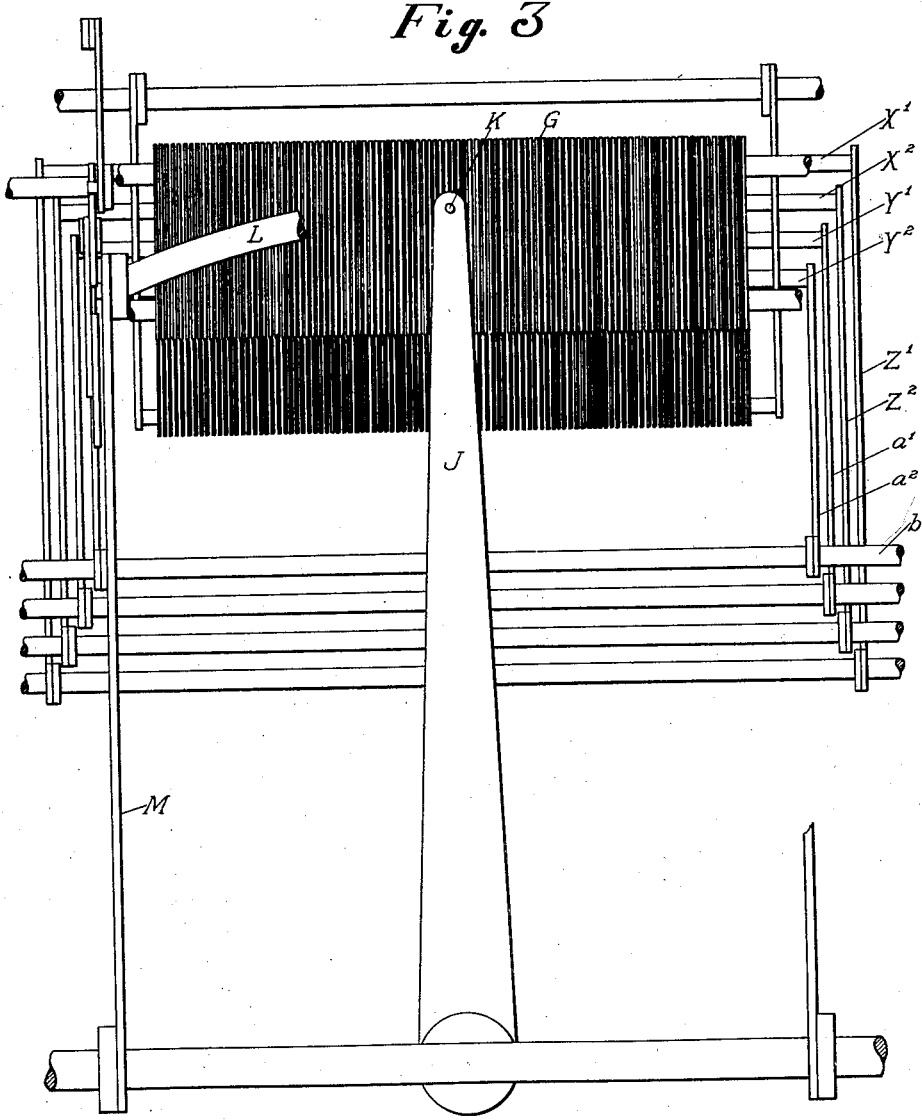
Fig. 3 is an end elevation at the right hand side of Fig. 1.

The machine includes a number of slides or other record controlling devices, one of which corresponds to each of the numbers to be indicated or recorded. A selecting device is arranged to move through a distance corresponding to the number to be recorded and selects the record controlling device which is to be operated. The movement of an operating shaft then causes the operation of the record controlling device which has been selected and also causes the operation of the recording devices under the control of such record controlling device. The same mechanism may be used for merely indicating the weight or other amount instead of recording it. The selecting device may be analogous to the pointer of a scale or other apparatus, which pointer moves through an arc which overlies the record controlling devices; the latter being, in the case illustrated, a series of plates lying alongside of each other with their edges adjacent to the arc of movement of the pointer; and the selected plate is moved by pressing the pointer against it.

Referring now to the embodiments of the invention illustrated, they are shown in connection with recording devices of the same sort as in the previous application above referred to; but it will be understood that other recording devices, or mere indicating devices may be substituted for those illustrated. Each of the recording devices illustrated comprises a slide A carrying types B for printing the numerals from zero to 9 respectively, the series commencing at zero with the uppermost type. The carrier A carries also a series of punches C. As the carrier rises the types from zero upward come successively into the printing line and a different group of the punches C comes into the punching line. Suitable hammers are then operated to print and punch on the card. A hammer-bar for the punches is indicated at C′ in Fig. 8; and the punches and types and the hammers for operating them may be of the construction disclosed more fully in the aforesaid previous application and may be of any other usual or suitable construction; these parts of the apparatus constituting no parts of the present improvements. The slides A are pulled upward by springs D fastened at their lower ends to the respective slides and at their upper ends to a fixed plate E through which the slides are guided. The slides are held down by a resetting rod F passing through slots in the several slides. There is one of the slides A for each decimal place of the amount to be recorded, that is one for the units place, one for the tens place, etc. When the record controlling devices have been set in proper position the resetting rod rises and the slides A are pulled up by their springs until stopped by the controlling devices, whereupon the printing and punching operation is effected as described.

Referring now particularly to the mechanism of Figs. 1 to 5, the record controlling devices consist of two sets of slides. The slides of what I have called the first set are indicated at G, G', etc., and those of the second set at H, H' and $H^2$. These slides and their operation are described in detail hereinafter. A selecting device, such for example as the pointer J of a weighing machine moves through distances corresponding to the respective amounts to be recorded. The slides G, G', etc., are arranged alongside of each other with their outer edges lying within the arc of movement of the finger K on the end of the pointer or arm J. In any position assumed by the pointer or arm the finger K overlies the edge of that one of the plates G which corresponds with the number to be recorded (or overlies the edge of the said plate and likewise the edge of an adjacent plate as hereinafter explained). The finger K having selected the appropriate member G is then pressed inward against the edge of the same to operate it and, through the slides H, H', $H^2$ and other intermediate mechanism controls the position to which the slide A rises. There are as many slides G, G', etc., as there are numbers to be recorded. There is one group of slides H, H', $H^2$ for each recording device or carrier A, there being as many of these carriers and corresponding groups of slides as there are decimal places in the maximum number which the machine can record. For example, for recording the number 999 there need be only three of the carriers A. The unit of measure, of course, may be pounds, tons, hundredweights, or any other desired unit.

The mechanism for advancing the slides G by pushing the finger K is as follows: An arc-shaped rod L overlies the back of the finger K in all positions of the latter and is carried between the ends of arms M which are normally pulled back to the position of Fig. 1 by springs N. One of the arms M carries a pin O which is engaged by a spring pawl P on the end of an arm Q on a rock shaft R. When this shaft is rocked in the direction shown by the arrow in Fig. 1 (by means of a crank R' at one end) the pawl P pushes the arm M forward which through the arc-shaped rod L advances the finger K to operate the selected slide or slides G, G', etc.

These slides G, G', etc., are slotted as shown, mounted on guide rods S and normally retracted to the position of Fig. 1 by means of a series of springs T which are offset from each other and attached to hooks on a fixed plate U. On the rear end of each of the slides G, G' are located certain projections in four horizontal planes, the projections in the several planes being indicated generically as V' and $V^2$, and W' and $W^2$. Two rows of projections, W' and $W^2$ for example are on the slides corresponding to the units, and the other two lines of projections, V' and $V^2$ on the slides corresponding to the tens; the present machine being designed to record only up to 99, that is to two decimal places. (The principle, however, may be extended to any desired number of places by increasing the number of lines of projections). The projections of any one of the series are different for the different plates of this series. Fig. 2, for example, shows the ends of the ten different plates corresponding to the numbers from 11 to 20. The projections are made in three different lengths, and by distributing them in the manner shown in Fig. 2 a different shape is provided for each of the series of plates, the zero plate of the series having no projections whatever.

Extending along the rear ends of the projections are rods X', $X^2$ for the unit series and Y', $Y^2$ for the tens series. When the slides G are pushed to the rear their rear ends move up to the normal position of the rods X', etc., and no farther. If it is a zero slide which is pushed back it, therefore, has no effect on these rods. If it is one of the other slides then it pushes one or two of these rods backward either one, two or three steps corresponding to the length of the projection or projections W', etc. The rods X', etc., are mounted upon arms Z', $Z^2$, a' and $a^2$ (Fig. 3) which are pivoted at their lower ends upon rods b; the arms Z', etc., being connected to the second set of slides hereinafter described so as to actuate the latter in a different way for each of the slides G; after which the parts are locked in their advanced position until the record is made.

One group of slides H, H', $H^2$ is shown in Fig. 5. The construction is the same for each group. The group shown in Fig. 5 may be assumed for example to be the same as that shown in Fig. 1, in each case the slide H is shown connected to the first arm $a^2$ and the second slide H' to the second arm a'. These two slides H, H' are provided with slots c through which passes a pin d projecting from the side of the third slide H² and having a head on it by which the three slides are held together. Again all three of the slides in the group are provided with guiding slots $e$ through which pass fixed pins $f$. The slides H and H' are pulled forward by springs $g$, $h$ respectively so that they normally press the rods Y', Y² against the projections on the separate number slides G, G', etc. The slide H² is pulled rearwardly by a spring $j$, but is normally restrained by the engagement of its pin $d$ with the rearward end of the slots $c$ in the slides H and H', each of the springs $g$ and $h$ being stronger than the spring $j$ so as to hold the slide H² unless both the slides H and H' are pushed to the rear.

The ends of the slides H, H' and H² are stopped; and as one or another of these slides is moved to the rear a distance of one, two or three steps its end constitutes a stop upon which strikes a pin $m$ on an arm of the corresponding carrier A. When no one of the slides H, H' and H² of a particular group is pushed back (corresponding to a zero record) the carrier A is prevented from rising by the engagement of a pin $n$ with a stop or hook $o$ carried on the zero lever $p$ having an arm $k$. However, when any one of the slides H or H' is advanced in order to record a number greater than zero a projection $q$ on said slide pushes the arm $k$ and turns the zero lever $p$ against the tension of its spring $l$ so as to remove the hook $o$ and allow the carrier to rise the proper distance.

To record the finite numbers, Fig. 2 shows that for No. 1 both the slides H and H' will be pushed backward three full spaces. The slide H² will go with them under the influence of its spring and its lower edge P' will serve as a stop, allowing the pin $m$ on the carrier to rise only a single step. In the same way for No. 2 and No. 3 the slide H² will be allowed to move out only two steps and only one step respectively, bringing the shoulders P² and P³ respectively into line with the pin $m$ and allowing the latter to rise two steps and three steps respectively. For Nos. 4, 5 and 6 the second slide H' alone will be advanced moving respectively three steps, two steps and one step and bringing respectively its lower edge and its first and second shoulders into play and limiting the upward movement of the pin to four, five and six steps respectively. Since only the second slide H' is moved backward in this operation the slide H² is still held by the engagement of its pin $d$ in the slot of the slide H; so that the slide H² cannot interfere with the rising of the pin $m$. Similarly for Nos. 7, 8 and 9 the slide H alone is moved out to distances of three steps, two steps and one step and stops the rise of the pin $m$ at distances corresponding to Nos. 7, 8 and 9 respectively.

The mechanism above described takes care of the desired operation where a single one of the slides G is operated, and is sufficient for mechanisms in which only a single slide will be operated, as for example where the selecting device always moves to positions corresponding exactly with one of the slides G or other devices corresponding to the separate numbers. But with the ordinary type of weighing machines the finger K will often stand immediately opposite the dividing line between two of the slides G. It cannot be permitted to enter the space between two such slides, because then it would have no effect upon the slides. It is, therefore, made broad enough to cover this space. This being the case it will often operate two of the slides simultaneously, and supplementary mechanism is provided to insure the control of the record by only one of any two slides which may be operated, the lower one of such two slides in the case illustrated.

According to the mechanism of Figs. 1 to 5 this result is accomplished by effecting the retraction of the higher one, before the record is made, so that the record is made under control of the lower slide alone. The operation will be understood from Figs. 1 and 4, the latter showing two adjacent slides G and G' which may correspond for example to the Nos. 16 and 17. Each slide carries a pivoted locking arm $s$ which is normally pulled upward by a spring $t$. A fixed rod $u$ overlies the ends of the several locking arms $s$ in the retracted position of the slides. When a slide is advanced and the locking arm $s$ is permitted to swing upward, its hook-shaped end engages the rod $u$ and prevents the return of the slide. Each arm $s$, however, has a lateral projection $v$ extending under the next higher slide. The lower edge of the next slide has a notch $w$ at a point in advance of the projection $v$ so that if the slide G is advanced and the slide G' remains stationary the projection $v$ and the arm $s$ will be allowed to rise and to lock the lower slide G. But if both slides G and G' advance together the projection $v$ corresponding to the slide G will be held down and the corresponding locking arm $s$ will also be held down so that when the pressure on the finger K is removed the slide G will swing back to its starting position and will have no effect upon the record. Therefore, when any two slides are advanced together the lower one will not be locked; but the upper one, the projection $v$ of which rides along the lower edge of the next higher slide, will be locked; and in the subsequent operation of the recording devices the higher of the two operated slides will control the record. The same mechanism might be reversed so as to record always the lower one of any two numbers whose slides are actuated, if preferred.

For restoring the locked slide to its normal position and unlocking rod $x$ runs along in the front of tails $y$ of the several locking levers *s*. The rod *x* is pulled forward by a spring *z* and is mounted on the lower end of a lever 2, the upper end of which is connected by a link 3 of an arm 4 of a bell crank lever, the other arm 5 of which carries a pin 6. The rock shaft R carries an arm 7 on the end of which is a spring pawl 8 adapted to strike the pin 6 when the shaft R is rocked to actuate one of the slides. When the shaft R advances the pawl P forces the pin O forward and then, after the pawl passes its central pin, releases the pin so as to allow the retracted movement of one of the slides as previously explained. After the recording operation the shaft R is rocked in the opposite direction and the pawl 8 pushes up the pin 6, and forces the unlocking rod *x* against the tail *y* of the slide G which remains advanced, unlocking this slide and permitting the retraction under the influence of its spring.

In the machine shown in Figs. 6, 7 and 8 the separate number slides 9 are similar to the slides G, G' of Fig. 1. The pointer J and finger K, the arc-shaped rod L, arms M and spring N are substantially the same as in Fig. 1. The arm M has an extension which carries the pin O and the latter is operated by a spring pawl P on the end of an arm Q on a rock shaft R by which the finger is advanced to operate the selected slide or slides. The slides 9 are mounted in supporting plates 11, 12. The slides 9 are held in their normal positions by means of separate springs 13. They are, however, provided with teeth 14 adapted when they are advanced to click under and be held by a rod 15 overlying the several plates and mounted on arms 16 on a shaft 17 which has an arm 18 which is pulled forward by a spring 19 to hold the rod 15 down. The arm 18 has at its end a pin 20 adapted to be engaged by the spring pawl 21 on the end of an arm 22 on a rock shaft 23 which in turn may be connected by an arm 24 and link 25 to an arm 26 on the rock shaft R. As the shaft R is rocked to advance the arc-shaped rod L the pawl 21 strikes the pin 20. The selected slides 9 are, therefore, advanced and caught by the rod 15. On the return movement of the rock shaft R the pawl 21 presses the pin 20 outward and lifts the locking rod 15 to release the advanced slides 9 and permit their restoration to their original positions by their springs 13.

The forward movement of the slides 9 is made to control the extent of movement of carriers A, similar to those of Fig. 1 by introducing projecting devices into the paths of shoulders on the lower parts of said carriers. The handle of the machine which operates the recording devices may be connected to the rock shafts 23 and R by means of a link 27 connected to an arm 28 on the shaft 23. As in the machine previously described there are only two type carriers in the machine of Figs. 6 to 8, one for the tens place and one for the units. The tens carrier is provided with a shoulder 29 extending laterally across the planes of the several stops hereinafter described; and the unit carrier is provided with a similar stop 30. For the tens place there is a zero stop or hook normally overlying the shoulder 29 and comprising an arm 31 loosely pivoted on any one, say the lowest, of a series of tens shafts 32, and pulled toward its operative position by a spring. The zero arm 31 has a lateral extension 33 which bears against the several stop arms 34 which are fixed on the shafts 32 and which constitute the several stops for the tens carrier A. The No. 1 arm 34 has its shouldered end just one step above the zero arm 31; the No. 2 arm two steps above, etc., so that when the carrier is released from the zero stop its spring D will pull it up one, two or more steps until it strikes the one of the arms 34 which has been advanced and the types and punches will assume a corresponding position. When any one of the arms 34 is advanced it bears against the extension 33 of the zero stop 31 and pushes the latter out of engagement with the shoulder 29 so as to permit the carrier to rise.

For engagement with the shoulder 30 of the next carrier there is a similar zero stop 35 and similar numbered stops 36 mounted on a second set of shafts 37. The same principle may be extended to any desired number of decimal places. Mounted on the shafts 32 and 33 in planes parallel with the arms 34 and 36 are operating arms 38 and 39 (Fig. 6) normally retracted by springs and pushed outward by the slides 9 with which their upper ends contact. To preserve their alinement the upper ends of the unit arms 39 are alternately overlapped and the corresponding slides 9 cut in at their ends. Each of the tens arms 38 has a lateral extension 40 overlying a group of ten of the slides 9, corresponding to the units from zero to nine. Fig. 7 shows the grouping of these arms 38 and 39 and the arrangement of the arms corresponding to the successive numbers. For the first group of numbers from zero to nine there is no tens arm 38.

Where two of the numbered slides as Nos. 2 and 3 are operated simultaneously the stops 34 and 36 will naturally take care of this, since if two of such stops are advanced the carrier will rise only the distance permitted by the lower stop. In special cases, however, a special zero stop becomes necessary. A special stop 41 (Fig. 8) normally retracted by a spring is adapted to be advanced to position over the shoulder 30 of the units slide. This special stop 41 is connected by a link 42 to an arm 43 fixed on a shaft 44 which carries (Fig. 6) a second arm 45, the upper end of which has a pin in engagement with a projection 46 upon the starting zero. Therefore, when the plates 9 corresponding to the first zero and the next No. 1 are advanced, although the No. 1 stop 36 pushes out the regular zero stop 35, the supplemental zero stop 41 is advanced to prevent the rising of the carrier.

When the plates 9 corresponding to 20 and 21, 30 and 31 or the like are operated the supplementary stop 41 is again used in order to insure the recording of the lower number. All the No. 1 plates, that is in each group of ten plates, are provided with projections 47 engaging a pin or rod 48 on the end of an arm 49 on a shaft 50 which carries an arm 51 connected by a link 52 with a sort of equalizing lever 53, the lower end of which is connected by a link 54 with an arm 55 on a shaft 56 which has a second arm 57 carrying at its upper end a rod 58 extending across projections 59 on all of the zero plates except the starting zero. Now when either the No. 1 plates or the zero plates (except the starting zero) are advanced either the shaft 50 or the shaft 56 is rocked and the lever 53 transmits to the stop 41 a short movement, not sufficient to carry the stop to operative position over the shoulder 30. However, if both a unit plate and a zero plate are advanced and both the shafts 50 and 56 are rocked then the supplementary stop 41 (both ends of the lever 53 being moved) is given a full stroke, sufficient to carry it over the shoulder 30 and to suppress the operation of the unit-carrier.

The recording devices and the controlling means therefor are unattached to each other so that the two may be separately constructed and the controlling means may be introduced into operative position or withdrawn therefrom merely by a relative movement between the recording devices and the controlling means. No claim is made in the present application for the punching and printing apparatus specifically, these parts being covered in the aforesaid previous application.

Though I have described with great particularity of detail certain specific embodiments of the invention yet it is not to be understood therefrom that the invention is restricted to the particular embodiments disclosed. Various modifications thereof in detail and in the arrangement and combination of the parts may be made by those skilled in the art without departure from the invention.

What I claim is—

1. A machine of the class described having in combination recording devices, a part which moves different distances corresponding to different amounts, slides across the edges of which said part moves, means for moving those slides which correspond to the positions of said part, and stops operated by said slides and controlling said recording devices.

2. A recording apparatus including in combination a series of movable record-controlling devices corresponding to the characters to be recorded, means adapted to move two of said devices by a single operation of such means and means for utilizing only one of the two devices so moved to control the record.

3. A recording apparatus including in combination a series of movable record-controlling devices corresponding to the characters to be recorded, means adapted to move a plurality of said devices by a single operation of such means and intermediate mechanism for preventing utilization of all but one of said plurality of devices for controlling the record.

4. A recording apparatus including in combination a series of movable record-controlling devices corresponding to the characters to be recorded, means adapted to simultaneously move a plurality of said devices and means for withdrawing all but one of the devices so moved and making a record under control of that one.

5. A recording apparatus including in combination record-controlling devices, means for simultaneously setting a pair of adjacent record-controlling devices corresponding to the numbers, 10 and 11, 20 and 21, or the like and means for causing the recording of only the lower one of such two numbers.

In witness whereof, I have hereunto signed my name in the presence of two subscribing witnesses.

JOHN ROYDEN PEIRCE.

Witnesses:
D. ANTHONY USINA,
LULU STUBENVOLL.